Aug. 1, 1933.                    Z. HOLLOS                    1,920,175
          DRIVING MECHANISM FOR THE WHEELS OF DIVIDED SWINGING
                   AXLES OF MOTOR VEHICLES OR THE LIKE
                        Filed April 29, 1929        2 Sheets-Sheet 1
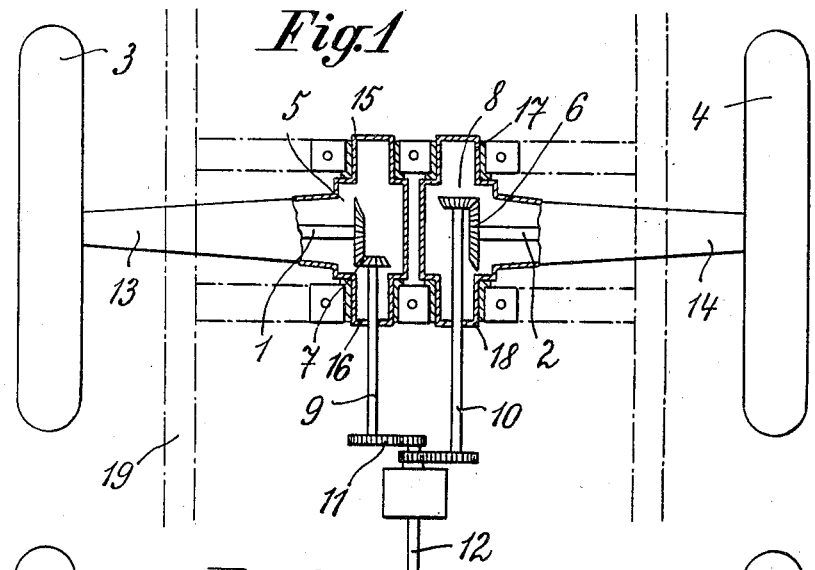
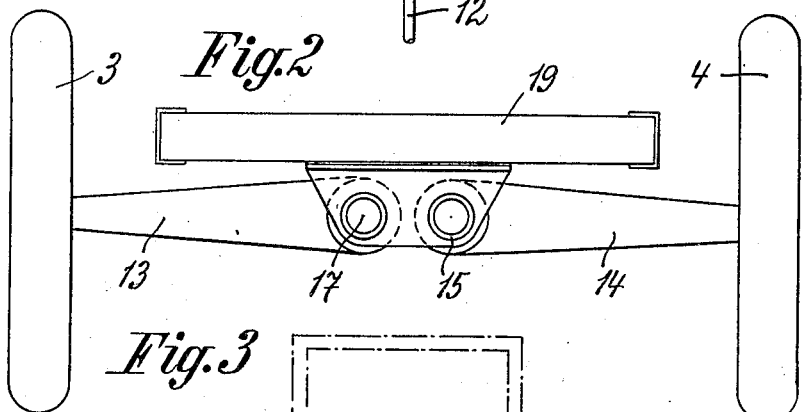
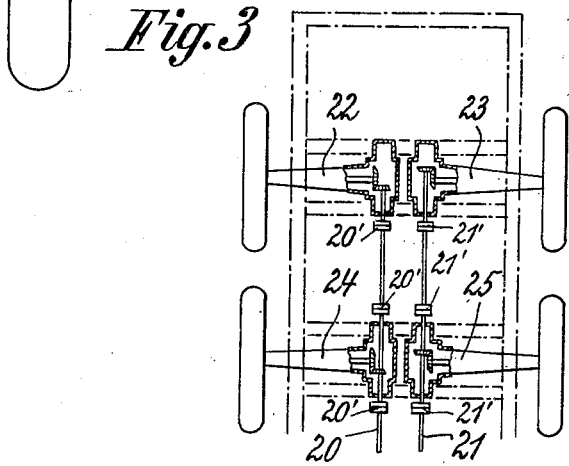
Inventor:
Zsigmond Hollós
By
Attorney.

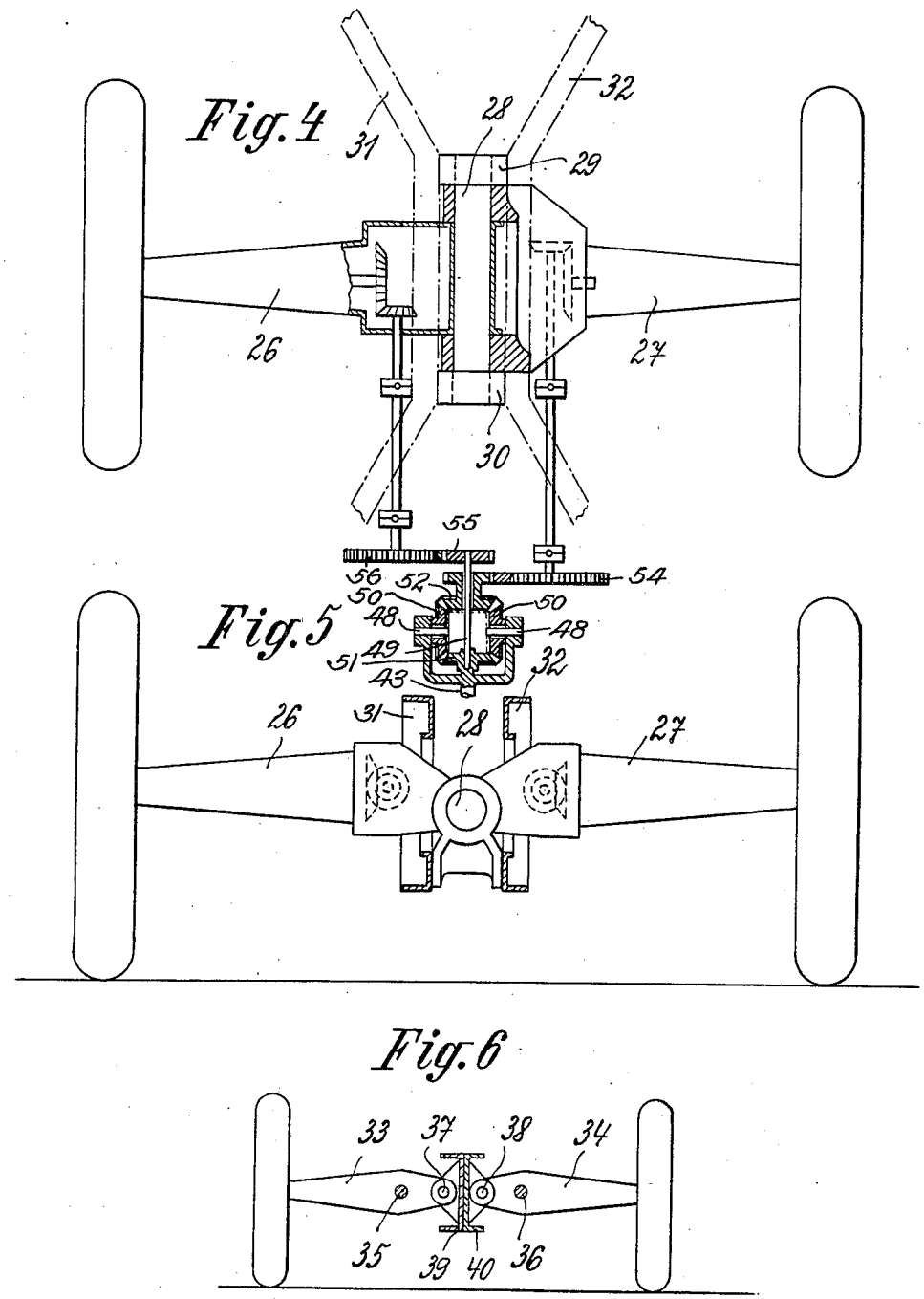

Patented Aug. 1, 1933

1,920,175

UNITED STATES PATENT OFFICE 1,920,175

DRIVING MECHANISM FOR THE WHEELS OF DIVIDED SWINGING AXLES OF MOTOR VEHICLES OR THE LIKE

Zsigmond Hollós, Vienna, Austria

Application April 29, 1929, Serial No. 359,144, and in Austria May 10, 1928

6 Claims. (Cl. 180—73.)

The safety in operation of the well known driving gears for the wheels of motor vehicles, arranged on the ends of divided swinging axles or housings is impaired by the fact, that the openings of the casing containing the common driving gear must be sufficiently large and need an exceedingly careful tightening by means of leather packing to avoid the leakage of oil and the intrusion of dirt.

This invention tends to remove this drawback by providing a separate driving shaft for each of the swinging half axles, the two driving shafts being positively connected by the differential gearing, driven as usual by the shaft of the motor. This enables the fixing of the bearings for the swinging axles directly on the frame, so that there is no necessity to provide the usual common casing for the gearings, since the half axles, pivoted in their bearings form themselves the casings for the gears enclosed in the swinging axles.

The invention is illustrated in the annexed drawings. Fig. 1 shows a form of execution of the driving mechanism in a plan view partly in horizontal section. Fig. 2 is a back view of the same driving mechanism. Fig. 3 is another form of execution of the gearing mechanism in plan view. Fig. 4 is still another form of the invention in a plan view partly in section. Fig. 5 is a cross-section of the gearing represented in Fig. 4. Fig. 6 is a cross section of a further gearing.

The driving gear represented in the Figs. 1 and 2 consists in the shafts 1 and 2 of the driven wheels 3 and 4, bevel wheels 5 and 6 being arranged at the inner ends of the respective shafts, engaging in the bevel wheels 7 and 8, arranged at the ends of the driving shafts 9 and 10 positively connected together by means of a differential gearing 11. The differential gearing 11 receives its movement from the motor by means of a shaft 12. The hollow half axles or housings 13, 14 containing the bearings of the shafts 1, 2 and a number of the bearings of the driving shafts 9, 10 are provided with pivots 15, 16, 17, 18, arranged in bearings coaxially with the shafts 9, 10 in the frame 19 of the vehicle.

In Fig. 3 there is represented a driving gear with two parallel driving shafts for two driven swinging axles or housings as in use for heavy vehicles. The driving shafts 20, 21 with universal joints 20', 21' are common for both pairs of the swinging axles 22, 23 and 24, 25. The remaining parts of the gear arrangement are the same as described in connection with Figs. 1 and 2.

Instead of arranging the bearings of the swinging axles as described, i. e. that the axis of their pivots is parallel with the longitudinal axis of the vehicle, there could also enter into consideration an arrangement of the bearings, according to which the swinging half axles or housings are pivoted in the manner, that they turn around a common pivot axis situated between the driving shafts.

In the Figs. 4 and 5 there is shown such an arrangement, the half axles or housings 26, 27 of which are free to turn around the common pivot 28, the ends of which are kept firmly in the bearings 29, 30. These bearings are fastened to the longitudinal beams 31, 32 of the frame of the vehicle. One of the half axles 26 or 27 could also be rigidly connected with the pivot 28 in which case the pivot must be rotatable in its bearings 29, 30. It is, of course, understood that the gearing 11 and the shaft 12 of Fig. 1 are to connect with the shafts 9 and 10.

The arrangement shown in Fig. 6 comprises two half axles or housings 33, 34, which may be driven by the shafts 35, 36 and which are pivoted each by means of a separate pivot 37, 38 to the longitudinal beams 39, 40 of the frame of the vehicle.

The differential gearing is illustrated on Figure 4 and is provided on the end of the motor shaft 43. It comprises a shell-like housing 42 which forms the bearing for the shaft 49 and the means in which the spindles 48 are secured. A conical gear wheel 50 is rotatably mounted on each spindle 48 and there is a further conical gear wheel 51 securely mounted on the shaft 49. A fourth conical gear wheel 52 is rotatably mounted on the shaft 49 and this latter gear wheel provides an integral construction with a gear 53 meshing with the gear 54 mounted on the shaft 10. A second gear 55 is securely mounted on the shaft 49 and this gear meshes with the gear 56 securely mounted on the other drive shaft 10. It can thus be clearly seen that rotation of the shaft 43 will impart rotation to the gears 50 which will in turn rotate the gears 51 and 52 in a differential ratio.

I claim as my invention:

1. A driving mechanism for the wheels of motor vehicles, comprising divided swinging housings having a wheel at one end of each thereof; a shaft for each housing and rotatably arranged therein; a driving shaft for each housing shaft and arranged parallel to the longitudinal axis of the vehicle, said housings being pivoted in common bearings arranged between the driving shafts; and differential gearing for operatively connecting the driving shafts together.

2. A driving mechanism for the driven running wheels of motor vehicles, comprising at least one pair of axle-housings, pivoted at their inner ends and disposed to swing substantially in one transverse plane, and having a running wheel at the outer end of each thereof, a driven shaft with a driven bevel gear wheel at the inner end thereof in each of the said housings, a driving bevel gear wheel in each of the said housings adapted to mesh with the driven bevel gear wheel, a driving shaft arranged parallel to the longitudinal axis of the vehicle for each of the said driving bevel gear wheels, means associated with the said driving shafts for taking up the swinging movement of the said axle-housings, and a differential gearing for operatively connecting the driving shafts together and with a main driving shaft, the said differential gearing being fixedly mounted independently of and apart from the axle-housings.

3. A driving mechanism according to claim 2, in which the means consists of universal joints.

4. A driving mechanism according to claim 2, in which a common axle is provided between the driving shafts and around which the housings swing.

5. A driving mechanism according to claim 2, in which separate pivots are provided between the driving shafts and around which the respective housings swing.

6. A driving mechanism according to claim 2, in which the pivots for the housings are the respective driving shafts.

ZSIGMOND HOLLÓS.